No. 840,569. PATENTED JAN. 8, 1907.
J. M. LEA.
ELECTRICAL MEASURING INSTRUMENT.
APPLICATION FILED SEPT. 25, 1906.
2 SHEETS—SHEET 1.
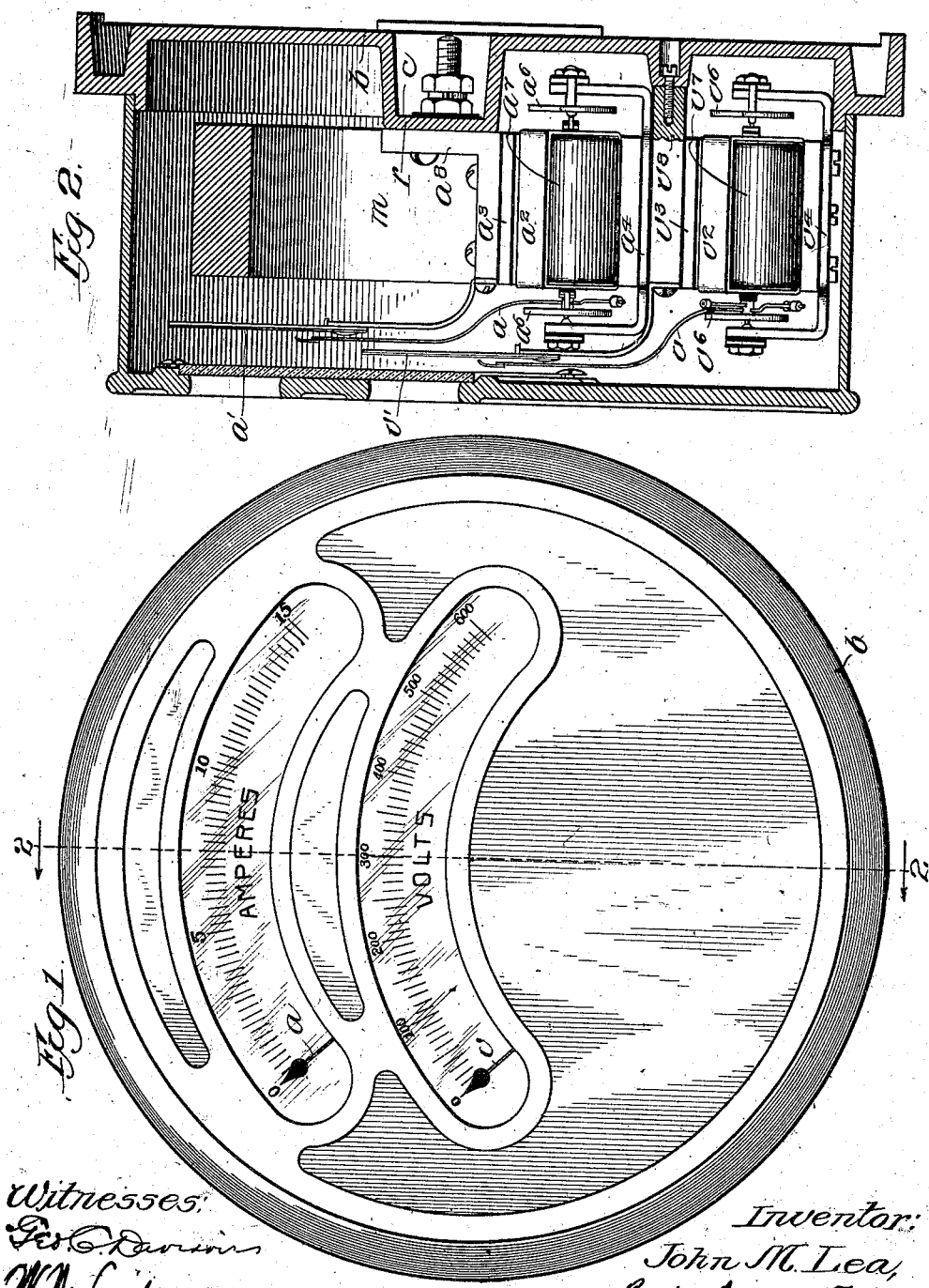

No. 840,569. PATENTED JAN. 8, 1907.
J. M. LEA.
ELECTRICAL MEASURING INSTRUMENT.
APPLICATION FILED SEPT. 25, 1906.

2 SHEETS—SHEET 2.

Witnesses.
Geo. C. Davison.
W. H. Leach.

Inventor:
John M. Lea,
By Barton, Jenner & Folk
Attys

UNITED STATES PATENT OFFICE.

JOHN M. LEA, OF CHICAGO, ILLINOIS, ASSIGNOR TO INTERNATIONAL ELECTRIC METER COMPANY, OF CHICAGO, ILLINOIS, A CORPORATION OF ILLINOIS.

ELECTRICAL MEASURING INSTRUMENT.

No. 840,569.     Specification of Letters Patent.     Patented Jan. 8, 1907.

Application filed September 25, 1906. Serial No. 336,120.

*To all whom it may concern:*

Be it known that I, JOHN M. LEA, a citizen of the United States, residing at Chicago, in the county of Cook and State of Illinois, have invented a certain new and useful Improvement in Electrical Measuring Instruments, of which the following is a full, clear, concise, and exact description.

My invention relates to an electric measuring instrument; and its object is to provide an improved construction whereby two separate and independent instruments, such as an ammeter and a voltmeter, may be compactly mounted within the same casing, so as to occupy the minimum space and present a neat appearance without sacrificing accuracy, delicacy of adjustment, or strength.

My invention also contemplates an improved mounting such that the connecting-wires may all be conveniently led to the various terminals through a channel in the back plate.

I will describe my invention more particularly by reference to the accompanying drawings, in which—

Figure 3:
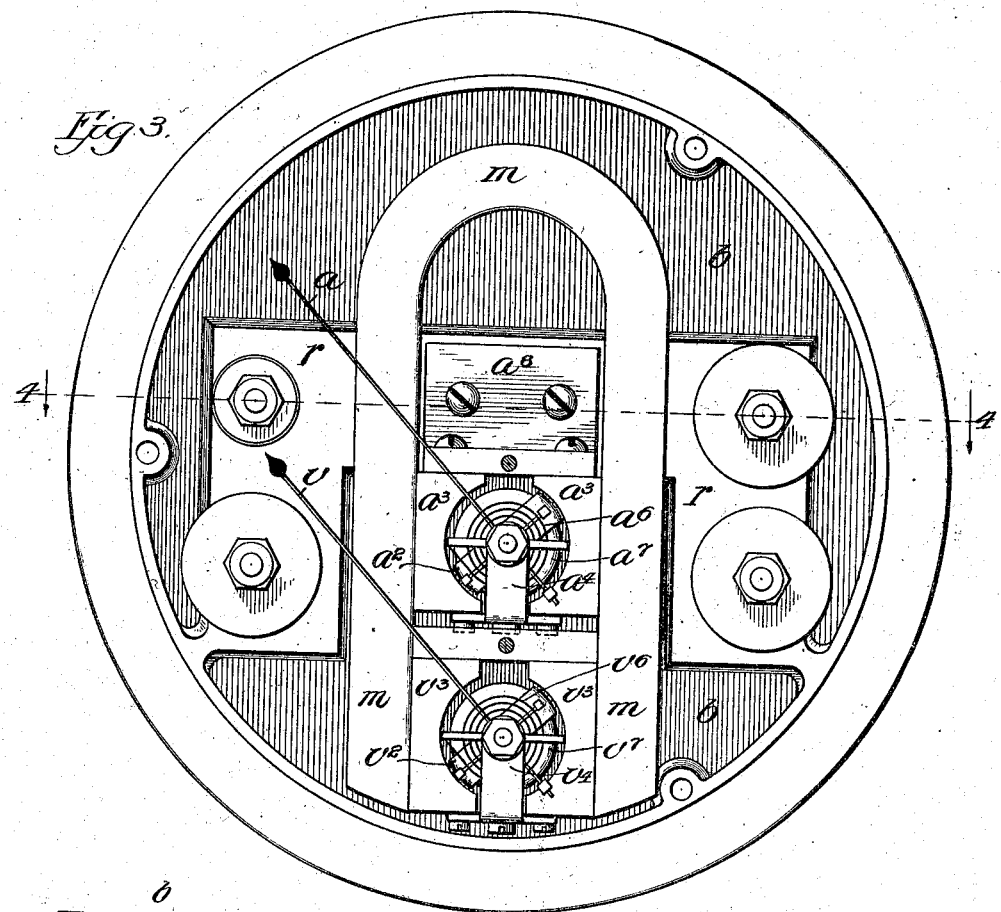
Figure 4:
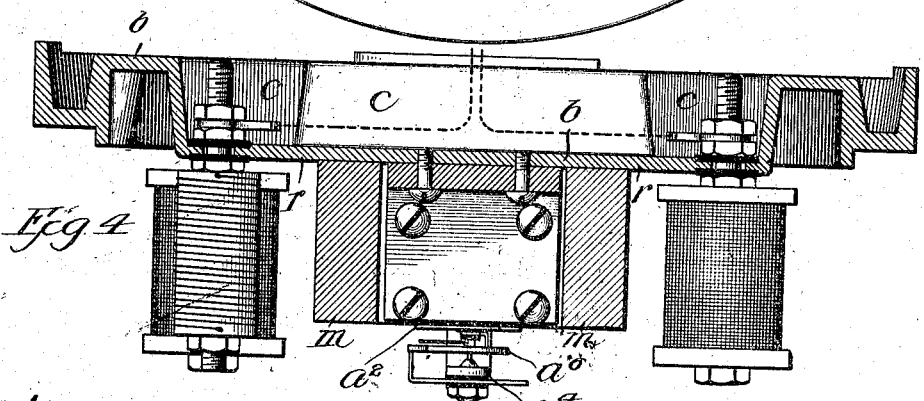

Figure 1 is a front view of a combined ammeter and voltmeter constructed according to my plan. Fig. 2 is a vertical sectional view thereof on line 2 2 of Fig. 1. Fig. 3 is a front view of the interior mechanism, the cover and the two scale-plates having been removed; and Fig. 4 is a transverse sectional plan view on line 4 4 of Fig. 3.

The same letters of reference indicate the same parts wherever they occur.

The instrument comprises two separate and independent "meter-movements," each with its own needle and separate scale arranged in tandem within the single inclosing case, great compactness of arrangement being made possible by disposing the meter-movements one behind the other close together, so that their scales are in arcs lying one within the other. The needles $v$ and $a$ may be arranged to swing in separate planes one above the other, and separate scale-plates $v'$ $a'$ are provided, which may be independently supported, as shown, one between the planes of the two needles and one underneath the lower needle. The meter-movements in the instrument illustrated are of the d'Arsonval type, comprising moving coils $a^2$ $v^2$, adapted to carry the current to be measured, (or a fraction thereof,) each of said coils being pivoted to swing between the concave pole-pieces of a permanent magnet, a soft-iron stationary core $a^7$ or $v^7$ being mounted centrally between said concave pole-pieces, leaving an annular air-gap in which the coil moves. I provide a single horseshoe-magnet $m$ to furnish the magnetic field for both of the meter-movements, two sets or pairs of concave opposing pole-pieces $a^3$ $v^3$ being disposed between the arms of said magnet. Each pair of pole-pieces carries a U-shaped bracket $a^4$ or $v^4$, in the upturned arms of which the pivot-pins for the moving coils are mounted, these brackets also serving to support the central soft-iron cores $a^7$ $v^7$. Current is conveyed to and from each moving coil by a pair of spiral coiled springs $a^6 a^6 v^6 v^6$, which also serve to oppose the motion of the coil under the influence of the current.

The meter-movement, composed of the pole-pieces $a^3$ $a^3$, core $a^7$, and the pivoted spring-mounted coil $a^2$ carrying pointer $a$, is the ammeter movement and is supported between the arms of the magnet $m$ upon a bracket $a^8$, which is mounted upon a raised ridge $r$ upon the back plate $b$ of the instrument. The voltmeter-movement, composed of similar parts, is also mounted upon a bracket $v^8$ between the arms of said magnet $m$ close beside the ammeter-movement, so that the two are in tandem arrangement. The single horseshoe-magnet thus furnishes the magnetic field for both ammeter and voltmeter, and the construction indicated permits of a very compact disposition of parts, such that the ammeter and voltmeter scales may appear one immediately under the other upon the face of the instrument.

The ridge $r$, upon which the bracket $a^8$ is mounted, is formed by a raised portion of the cast-metal back plate, extending across the front face thereof and down on either side of the magnet $m$, a corresponding channel $c$ being left thereby in the rear face of said back plate. The spools for the various wire resistances required in the instrument may be mounted upon terminal bolts extending through the back plate upon said ridge. The conducting-wires to make connection with said terminals may therefore conveniently be led along in the channel in the rear face of the back plate and secured to the projecting ends of the terminal bolts, said projecting ends of the bolts being inclosed within and protected by the channel or recessed portion. This construction will be desirable both in switchboard instruments and portable instruments, but more particularly in instruments intended to be used on automobiles, as the wires may be all led through a single hole in the dashboard, lying behind and concealed by the instrument, said wires upon emerging from the hole being led along the channel in the rear face of the back plate to their respective terminal pieces.

Having thus described my invention, I claim as new and desire to secure by Letters Patent—

1. A combined voltmeter and ammeter having separate meter-movements mounted in tandem and indicating-needles therefor swinging in planes one above the other, a scale-plate mounted in a plane between the planes of said needles, and a separate scale-plate under the lower needle.

2. In an electric measuring instrument, the combination with a base-plate having a raised portion forming a ridge upon the front face and a channel in the back, of a meter-movement and a bracket-support therefor mounted upon said ridge, electrical terminal pieces also mounted upon said ridge and extending through said ridge into the channel upon the back, said channel affording a free space for running the wires to said terminals in the back of the instrument.

3. In an electrical measuring instrument, the combination with a base-plate having a raised portion forming a ridge across the front face of the plate and a channel in the back thereof, of a horseshoe-magnet resting against said ridge, a bracket mounted upon said ridge, a meter-movement supported by said bracket between the arms of said horseshoe-magnet, a second bracket mounted on said base-plate and a second meter-movement supported between the arms of said magnet, in tandem with the first movement, indicating-needles for said meter-movements arranged to swing in planes one above the other, and independently-supported scale-plates over which said needles are adapted to swing.

In witness whereof I hereunto subscribe my name this 15th day of September, A. D. 1906.

JOHN M. LEA.

Witnesses:
D. C. TANNER,
A. H. MOORE.